United States Patent
Wheeler et al.

(10) Patent No.: US 11,463,426 B1
(45) Date of Patent: Oct. 4, 2022

(54) VAULTLESS AUTHENTICATION

(71) Applicant: SailPoint Technologies, Inc., Wilmington, DE (US)

(72) Inventors: Christopher Chad Wheeler, Denver, CO (US); Ryan Privette, Denver, CO (US); Cameron Williams, Denver, CO (US); Cory Davies, Centennial, CO (US)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 168 days.

(21) Appl. No.: 16/258,101

(22) Filed: Jan. 25, 2019

Related U.S. Application Data (60) Provisional application No. 62/621,742, filed on Jan. 25, 2018.

(51) Int. Cl.
*H04L 9/40* (2022.01)

(52) U.S. Cl.
CPC ...... *H04L 63/0807* (2013.01); *H04L 63/0838* (2013.01); *H04L 63/102* (2013.01); *H04L 2463/082* (2013.01)

(58) Field of Classification Search
CPC .............. H04L 63/0807; H04L 63/0838; H04L 63/102; H04L 2463/082
See application file for complete search history.

(56) References Cited

U.S. PATENT DOCUMENTS

| 6,480,847 | B1 | 11/2002 | Linenbach | |
|---|---|---|---|---|
| 6,765,591 | B2 | 7/2004 | Poisson | |
| 7,089,585 | B1* | 8/2006 | Dharmarajan | H04L 63/0815 370/312 |
| 7,093,282 | B2* | 8/2006 | Hillhouse | G06F 21/46 380/28 |

(Continued)

FOREIGN PATENT DOCUMENTS

| WO | WO 2016133958 | 8/2016 |
|---|---|---|
| WO | WO 2016138067 | 9/2016 |

OTHER PUBLICATIONS

Jianping Pan, Y. Thomas Hou, Bo Li "An overview of DNS-based server selections in content distribution networks", 2003, Elsevier, p. 695-711 (Year: 2003).*

(Continued)

*Primary Examiner* — Catherine Thiaw
(74) *Attorney, Agent, or Firm* — Sprinkle IP Law Group (57) ABSTRACT

Various embodiments of the present technology use a combination of static and rotating access credentials to access target devices. Some embodiments start with a multi-factor authentication (MFA) token that can be used to log into the platform head-end. If approved, a landing page requesting login credentials can be presented to the user. The user can provide a username and password via landing page and select a PAM or CASB target. The system then issues a secondary access credential (e.g., a pin/token) that is unknown to the user and is placed into a vault. A dynamic credential can be dynamically generated at each request. The (Continued)

target device can use the static access credential from the vault and the dynamic access credential for access to the device. As such, even if the vault is comprised, the target device would be inaccessible without the dynamic token which constantly changing.

15 Claims, 6 Drawing Sheets

(56) References Cited

U.S. PATENT DOCUMENTS

| | | | |
|---|---|---|---|
| 7,124,228 B2 | 10/2006 | Grouzdev | |
| 7,249,378 B2 | 7/2007 | Wesinger | |
| 7,590,074 B1 | 9/2009 | Dondeti | |
| 7,890,767 B2 | 2/2011 | Smith et al. | |
| 8,099,503 B2 | 1/2012 | Yeates et al. | |
| 8,281,129 B1* | 10/2012 | Asghari-Kamrani | G06Q 20/3823 713/168 |
| 8,448,241 B1 | 5/2013 | Kadakia | |
| 8,555,403 B1 | 10/2013 | Kilday | |
| 8,671,224 B2 | 3/2014 | Bell | |
| 8,966,260 B1 | 2/2015 | Walter | |
| 9,069,947 B2 | 6/2015 | Kottahachchi | |
| 9,098,582 B1* | 8/2015 | Bass | G06F 16/951 |
| 9,152,783 B2 | 10/2015 | Kottahachchi | |
| 9,390,255 B2 | 7/2016 | Sharma | |
| 9,503,452 B1 | 11/2016 | Kumar et al. | |
| 9,654,507 B2 | 5/2017 | Gangadharappa | |
| 9,705,919 B1 | 6/2017 | Jacobson | |
| 9,699,261 B2 | 7/2017 | Sade | |
| 9,882,892 B1* | 1/2018 | Vogel | H04L 63/102 |
| 9,928,839 B1 | 3/2018 | Lester et al. | |
| 9,947,008 B1 | 4/2018 | Camacho Diaz | |
| 10,122,703 B2 | 11/2018 | Innes et al. | |
| 10,229,262 B2 | 3/2019 | Cherukuri | |
| 10,262,129 B1 | 4/2019 | Gupta | |
| 10,299,118 B1* | 5/2019 | Karachiwala | H04L 67/26 |
| 10,341,316 B2 | 7/2019 | Dvorak | |
| 10,965,665 B1 | 3/2021 | Privette | |
| 11,240,240 B1 | 2/2022 | Williams | |
| 11,303,633 B1 | 4/2022 | Williams | |
| 2002/0049883 A1 | 4/2002 | Schneider | |
| 2004/0030931 A1 | 2/2004 | Chamandy | |
| 2004/0162787 A1* | 8/2004 | Madison | G06Q 10/02 705/64 |
| 2006/0064600 A1* | 3/2006 | Polichetti | G06F 21/32 713/183 |
| 2008/0148349 A1 | 6/2008 | Stevens | |
| 2009/0037729 A1 | 2/2009 | Smith et al. | |
| 2011/0202982 A1 | 8/2011 | Alexander et al. | |
| 2011/0307436 A1* | 12/2011 | Cai | G06F 16/322 706/48 |
| 2012/0137131 A1* | 5/2012 | Lu | H04L 9/3228 713/168 |
| 2015/0067832 A1 | 3/2015 | Sastry | |
| 2015/0350186 A1* | 12/2015 | Chan | H04L 63/0807 726/9 |
| 2016/0094991 A1* | 3/2016 | Powell | G06Q 20/40 455/411 |
| 2016/0140550 A1 | 5/2016 | Keys | |
| 2016/0323273 A1* | 11/2016 | Aufderheide, Jr. | H04L 63/0861 |
| 2016/0342992 A1* | 11/2016 | Lee | G06Q 30/06 |
| 2017/0011214 A1* | 1/2017 | Cavanagh | H04L 63/06 |
| 2017/0012969 A1* | 1/2017 | Li | G06F 21/34 |
| 2017/0078275 A1 | 3/2017 | Slovetskiy | |
| 2017/0295181 A1 | 10/2017 | Parimi | |
| 2017/0310601 A1 | 10/2017 | Yu | |
| 2018/0367526 A1* | 12/2018 | Huang | H04L 63/105 |
| 2019/0019184 A1* | 1/2019 | Lacey | G06Q 20/4016 |
| 2019/0182042 A1* | 6/2019 | Ebrahimi | H04L 9/3231 |
| 2020/0019693 A1 | 1/2020 | Zhao | |
| 2020/0059881 A1 | 2/2020 | Gupta | |
| 2021/0082271 A1 | 3/2021 | Mars | |
| 2022/0086137 A1 | 3/2022 | Rivette | |
| 2022/0109675 A1 | 4/2022 | Williams | |

OTHER PUBLICATIONS

Cisco, "Cisco AnyConnect Secure Mobility Client," retrieved on Aug. 7, 2018, from <<https://www.cisco.com/c/en/us/products/security/anyconnect-secure-mobility-client/index.html>>, 10 pgs.
Wikipedia, "Cloud Computing Security," retrieved on Aug. 7, 2018, from <<https://en.wikipedia.org/wiki/Cloud_computing_security>>, 8 pgs.
Wikipedia, "Network Security," retrieved on Aug. 7, 2018, from <<https://en.wikipedia.org/wiki/Network_security>>, 4 pgs.
Tempered Networks, Inc. Identity-Defined Network (IDN) Architecture, www.temperednetworks.com, 2016, 16 pgs.
Office Action for U.S. Appl. No. 16/100,056, dated Aug. 13, 2020, 28 pgs.
Notice of Allowance for U.S. Appl. No. 17/023,158 dated Nov. 18, 2020, 5 pgs.
Office Action for U.S. Appl. No. 16/100,056, dated Mar. 10, 2021, 32 pgs.
Office Action for U.S. Appl. No. 16/100,068, dated Apr. 28, 2021, 14 pgs.
Office Action for U.S. Appl. No. 16/100,056, dated Jul. 13, 2021, 14 pgs.
Notice of Allowance for U.S. Appl. No. 16/100,056, dated Nov. 10, 2021, 5 pgs.
Notice of Allowance for U.S. Appl. No. 16/100,068, dated Nov. 15, 2021, 10 pgs.
Office Action for U.S. Appl. No. 17/181,878, dated Jan. 20, 2022, 5 pgs.
Notice of Allowance for U.S. Appl. No. 17/181,878 dated Apr. 27, 2022, 5 pgs.
Notice of Allowance for U.S. Appl. No. 16/100,056, dated Feb. 15, 2022, 2 pgs.

* cited by examiner

VAULTLESS AUTHENTICATION

CROSS-REFERENCE TO RELATED APPLICATIONS

This application claims priority to U.S. Provisional Application Ser. No. 62/621,742 filed on Jan. 25, 2018, which is incorporated herein by reference in its entirety for all purposes.

TECHNICAL FIELD

Various embodiments of the present technology generally relate to network security. More specifically, some embodiments of the present technology relate systems and methods for vaultless authentication.

BACKGROUND

Modern electronic devices such as computers, tablets, mobile phones, wearable devices, and the like have become an integral part of modern life. These electronic devices can be connected through various networks and/or network components which allow for access and sharing of files or data, communications (e.g., emails and video conferencing), and the like between the electronic devices. Many users of electronic devices routinely utilize various types of software application for business and personal activities. Examples of software applications can include word processors, spreadsheet applications, email clients, notetaking software, presentation applications, games, computational software, and others. In many cases, businesses rely heavily on these devices to meet customer needs.

The networks can include a variety of components (e.g., switches, routers, firewalls, repeaters, or other network nodes) which can be arranged to form complicated network topologies that facilitate the exchange of data. Securing the computing and network resources from various threats is important to prevent unauthorized access of data or service attacks. Attackers try to penetrate networks, obtain privileged account access, interfere with business activities, collect sensitive information, and the like. As such, many businesses have IT departments responsible for deploying, maintaining, and securing the hardware, services, software applications, data, and network components that make up the network infrastructure. For example, network administrators can set in place various security systems and protocols that can include techniques for the authorization or denial of access to data or network infrastructure components (hardware or software).

Managing these resources can be difficult and time consuming, especially for small businesses that may not have large IT departments. For example, in many cases, these businesses used a blend of cloud computing resources along with local network components all which have differing security needs and management issues. As such, there are numerous challenges and inefficiencies created in traditional network security systems. There are currently a variety of traditional security options that businesses can deploy and many businesses often use multiple of these traditional security options. However, these options are often separate solutions that must by independently maintained and can therefore leave gaps in security coverage.

SUMMARY

Various embodiments of the present technology generally relate to network security. More specifically, some embodiments of the present technology relate systems and methods for vaultless authentication. Some embodiments provide for an access management system comprising an encrypted data store having stored therein multiple usernames and portions of passwords. The access management system may also include a credential change manager that sets access credential for one or more targets. The credential change manager is accessed with the usernames and portions of passwords stored in the encrypted data store. In some embodiments, the access management system may include a vault (e.g., a PIN vault), coupled with the credential change manager, wherein the vault stores one or more static passwords each corresponding to a user. A multi-factor authentication password generator may be present in some embodiments. The password generated may be coupled with the credential change manager and to generate a dynamic password to be combined with the static password static passwords to access to a corresponding target.

The access management system may also include a device selection module that presents the user with a list of the one or more targets the user can choose to access. The one or more targets may include a privileged access management or cloud access security broker device. In some embodiments, the credential change manager routinely changes the one or more static passwords and sets a seed for the dynamic password using the multi-factor authentication password generator. The one or more targets may be in communication with the credential change manager and routinely updated with the static password in addition to being updated with the dynamic password each time the dynamic password is generated.

Embodiments of the present invention also include computer-readable storage media containing sets of instructions to cause one or more processors to perform the methods, variations of the methods, and other operations described herein.

Some embodiments provide for a method for granting a user access to a device selection module through multi-factor authentication. In some embodiments, a desired target may be selected from a list of one or more targets available to a user. A static portion of an access credential (e.g., a token) may be retrieved from a vault. The static portion of the access credential may be specifically assigned to the user, the device, a specific user/device combination. A dynamic portion of the access credential can be generated and combined with the static portion to create a combined access credential that can be validated by the target device. In some embodiments, the target device may separate the static portion and dynamic portion and verify them separately. As such, if either verification fails, access would be denied. In other embodiments, the entire combined access credential can be validated at once (e.g., submitted to a separate validation module for verification).

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature.

BRIEF DESCRIPTION OF THE DRAWINGS

Embodiments of the present technology will be described and explained through the use of the accompanying drawings.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to network security. More specifically, some embodiments of the present technology relate to systems and methods for vaultless authentication. With the proliferation of modern computing devices, security continues to be a major issue. Attackers try to penetrate networks, obtain privileged account access, interfere with business activities, collect sensitive information, and the like. There are a variety of traditional security options that businesses can deploy. In fact, many businesses often use multiple of these traditional security options, which are often separate solutions that must be independently maintained and can leave gaps in coverage.

One commonly used solution is privileged access management (PAM). PAM is a broker system that allows system administrators and security engineers to connect, in a secure manner, to a target (e.g., client, router, servers, access points, firewalls, databases etc.). Once the system administrator has access to the target device, the system administrator may setup, deploy, access settings, and perform other actions with the target. PAM systems typically retrieve credentials from a vault and post the credential in-line. The broker system for PAM is often implemented as a gateway solution. Many companies often employ PAM as well as cloud access security brokers (CASB). CASB solutions provide a secondary proxy to a web security gateway to sanction access to cloud applications. Unfortunately, these solutions are not holistically combined and must be maintained separately by the users.

In contrast, various embodiments of the present technology provide an integrated security platform that combines PAM, CASB, identity access management, and multi-factor authentication onto one platform. This integration allows for a frictionless deployment that can be utilized by companies that may not have large teams of system administrators. As such, some embodiments provide a gateway solution and a proxy solution that is easy to deploy. The user equipment (e.g., computer, phone, point of sale terminal, etc.) can be used as a gateway. An agent can be included on each endpoint that combines gateway functionality of PAM as well as web rewrite and proxy functionality of a CASB deployment into an endpoint solution.

Historically, a password vault is used to store the username and password for the target device. However, this is inherently insecure as a breach of the vault allows access to the target device. Instead of having a vault that contains the access credentials for each of the target devices, various embodiments of the present technology use a combination of static and rotating tokens for access to the target device. Some embodiments start with a multi-factor authentication (MFA) token that can be used to log into the platform head-end. If approved, a landing page requesting login credentials can be presented to the user. The user can provide a username and password via landing page and then select a PAM or CASB target. The system then issues a secondary pin/token that is unknown to the user and is placed into a pin vault. The pin can be rolled (e.g., periodically, on a fixed schedule, upon detection of an event, etc.). A secondary token can be dynamically generated at each request to access a target device. The target device can then use the pin from PIN vault and the dynamic token for access to the device. As a result, even if the PIN vault is comprised, the target device couldn't be accessed without the dynamic token.

Various embodiments of the present technology provide for a wide range of technical effects, advantages, and/or improvements to computing systems, components, and/or operations. For example, various embodiments include one or more of the following technical effects, advantages, and/or improvements: 1) multi-zone security framework; 2) use of a combination of dedicated and dynamic certificates for accessing private networks; 3) remote device validation techniques based on device configurations (e.g., HMAC, storage configuration, memory configuration, OS version, etc.); 4) multi-layered encryption and identity based authentication process; 5) use of tokens for password abstraction; 6) target access via a unique token generated with a static portion and a dynamic portion; 7) agents that are identity aware (e.g., tracks HMAC, storage configuration, memory configuration, OS version, etc.) and build an identity profiles for machines; and/or 8) use of a unique identity profile for access of target devices. Other features, advantages, improvements, and/or technical effects will be apparent from the description of the various embodiments.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Figure 1:
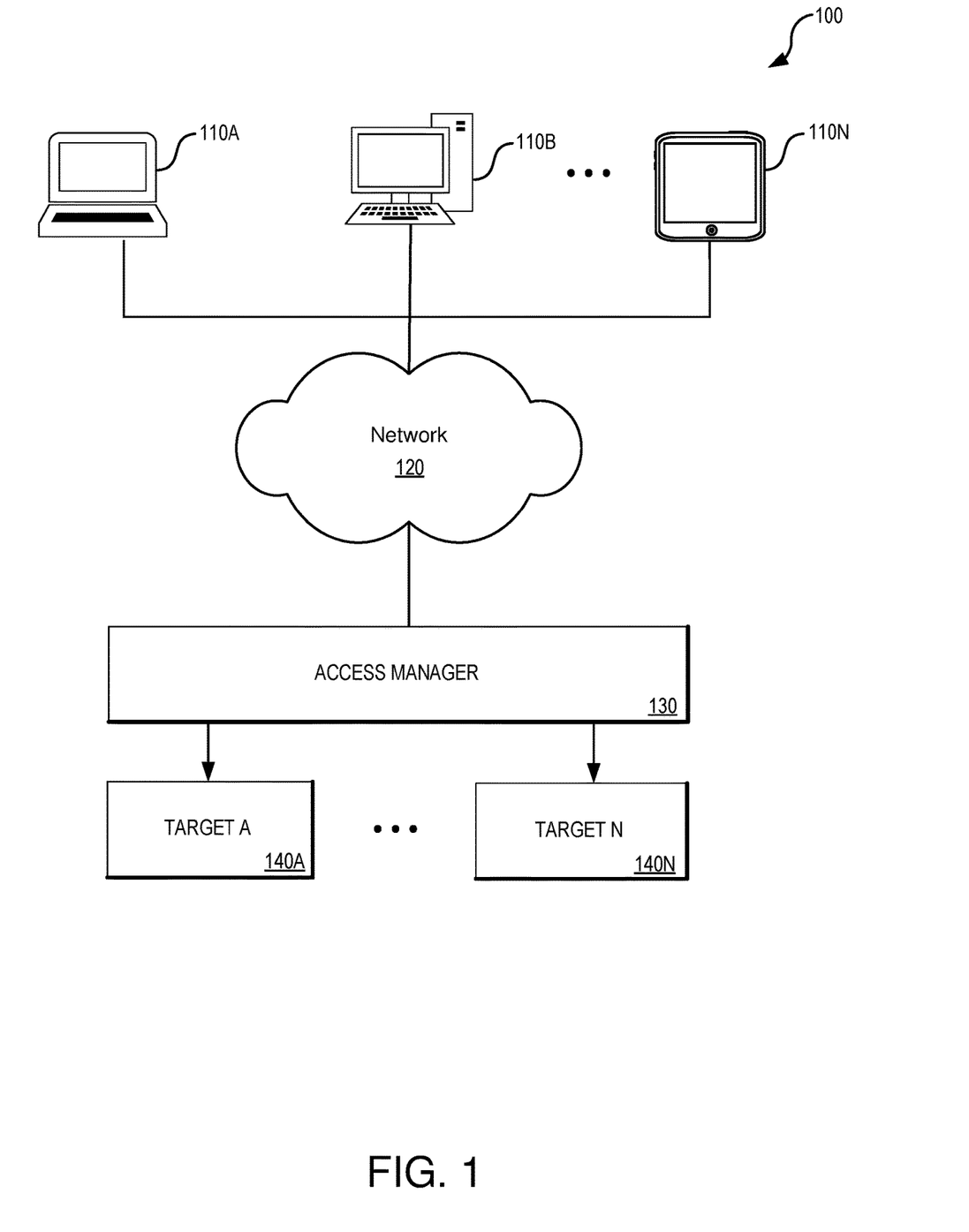
FIG. 1 illustrates an example of an environment which can be used in some embodiments of the present technology.
Figure 6:
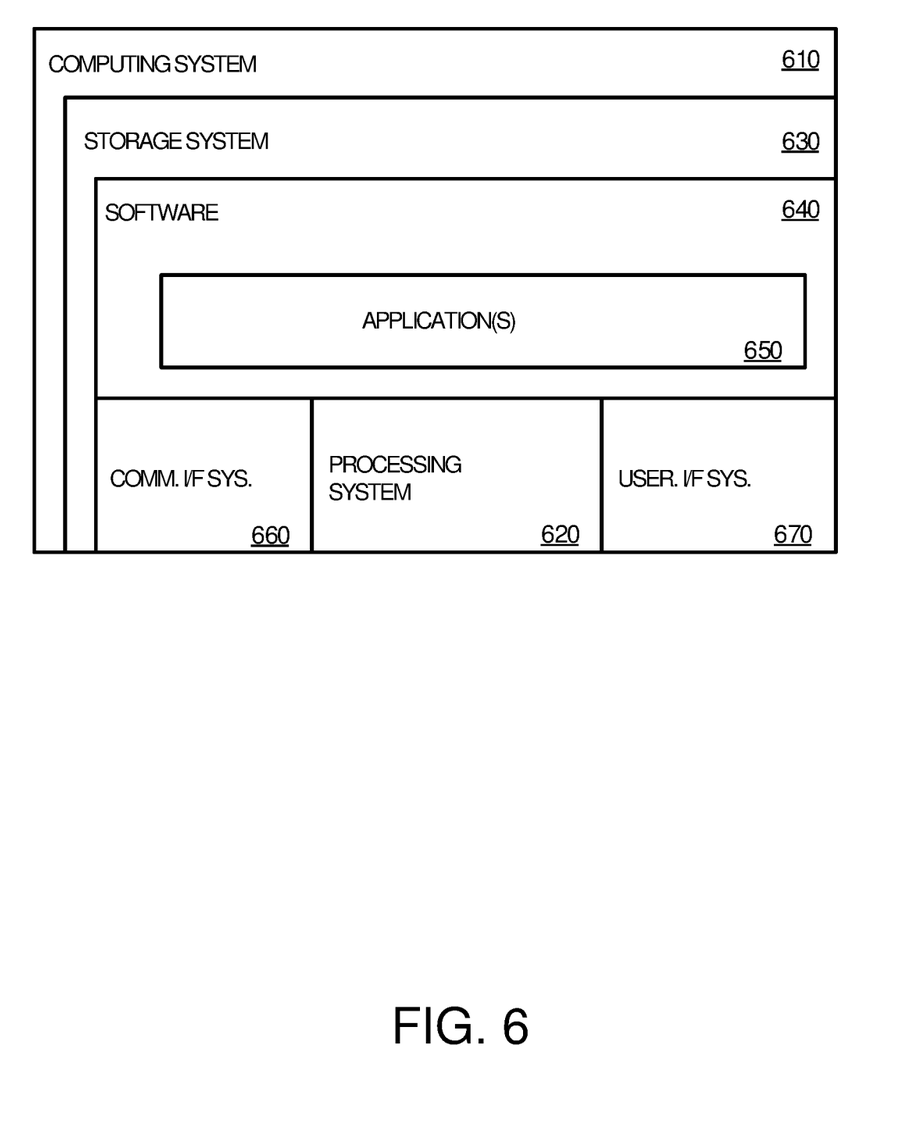
FIG. 6 is an example of a computer system that may be used in some embodiments of the present technology.

FIG. 1 illustrates an example of an environment 100 which can be used in some embodiments of the present technology. As illustrated in FIG. 1, environment 100 may include one or more computing (or endpoint) devices 110A-110N, communications network 120, access manager 130, and target devices 140A-140N. Computing devices 110A-110N can be any computing system capable of running an application natively or in the context of a web browser, streaming an application, or executing an application in any other manner. Examples of computing system 110 include, but are not limited to, personal computers, mobile phones, tablet computers, desktop computers, laptop computers, wearable computing devices, thin client computing devices, virtual and/or augmented reality computing devices, virtual machine hosting a computing environment, distributed application, server computer, computing cluster, application hosted as software as a service (SaaS), application running on a platform as a service (PaaS), application running on an infrastructure as a service (IaaS), or any other form factor, including any combination of computers or variations thereof. One such representative architecture is illustrated in FIG. 6 with respect to computing system 610.

Those skilled in the art will appreciate that various components (not shown) may be included in computing devices 110A-110N to enable network communication with communications network 120. In some cases, communications network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

In some embodiments, remote devices 110A-110N initially connect to access manager 130 for validation into targets 140A-140N. Remote devices 110A-110N call into access manager 130 that then validates the endpoint using various verification techniques (e.g., multi-factor authentication, username and password, fingerprints, etc.) for heightened security. Connections of remote device 110A-110N to access manager 130, in accordance with various embodiments, may use fingerprints automatically generated by a security application running on remote devices 110A-110N to be provided. For example, the initial connection of remote devices 110A-110N may not require fingerprint, however, subsequent attempts may require such information. In some embodiments, an initial registration process may provide initial tokens and fingerprints that can be used in the initial connection. If these components are not present or are invalid, a log or warning may be generated, or access may be denied. Upon successful validation, the access manager can retrieve a static portion and generate a dynamic token that together grant access to target devices 140A-140N.

Figure 2:
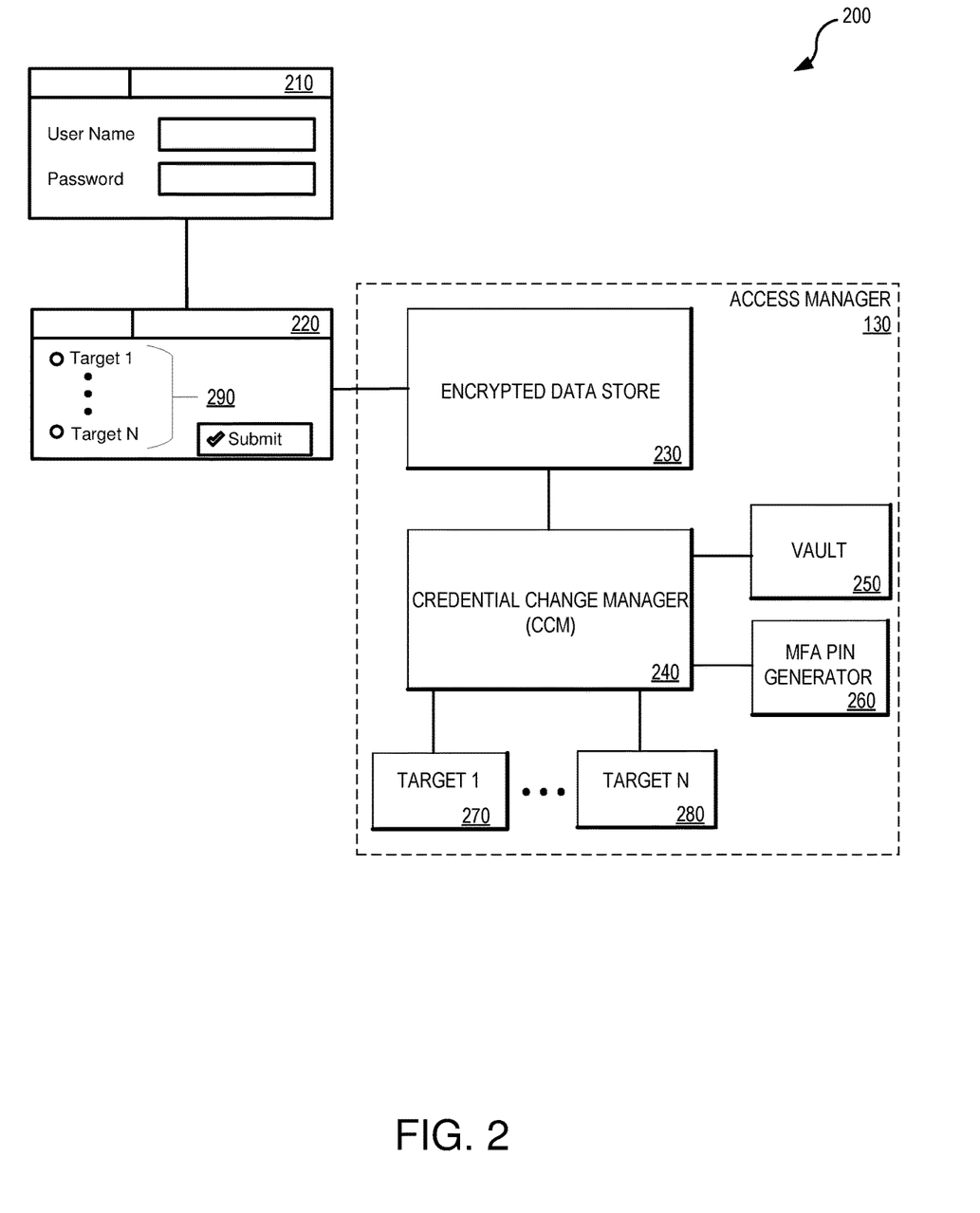
FIG. 2 illustrates a set of components that may be used in one or more embodiments of the present technology.

FIG. 2 illustrates a set of components that may be used in one or more embodiments of the present technology. As illustrated in FIG. 2, MFA can be used for a user to access front end landing page 210. Once access is granted, page 220 presents a list 290 of available target devices 270-280 that the user can access. Upon submission of the user's target device selection, a request is generated to access encrypted data store 230 to retrieve a username and portion of a password. The username and portion of a password are used to access credential change manager 240.

Credential change manager (CCM) 240 can be configured to set the access credential for target devices. In some embodiments, CCM 240 can assign a static portion of an access credential (e.g., pin, token, alphanumeric string, etc.) to a user, without the user knowing the static portion of the access credential. For example, CCM 240 (or another device) may randomly assign the static portion of the access credential. The static portion of the access credential can be stored in vault 250. CCM 240 can have routines that are time driven or event driven (e.g., periodically, on a fixed, schedule, on detection of an event, etc.) to change the static portion of the access credential (e.g., a four, eight, or sixteen digit PIN, token, alphanumeric string, etc.) and set the seed for a dynamic portion using a dynamic generator (e.g., MFA PIN generator 260).

The secondary dynamically generated portion of the access credential (e.g., token or pin) issued (e.g., by MFA PIN generator 260) can be combined (e.g., concatenated) with the static portion retrieved from vault 250. In some embodiments, the static and dynamic portions may always be concatenated in the same order. In other embodiments, the order may change based on a trigger (e.g., user, time, target, etc.) or event. Still yet, some embodiments may embed the static portion at a particular place within the dynamic portion or vice versa. As another example, the static portion or the dynamic portion may be repeated in full or partially. The combination can then be used for granting access to the target device 270-280. A few examples are illustrated in the following table with the static portion emphasized in the combined access credentials:

| Static Portion | Dynamic Portion | Combined Access Credential |
|---|---|---|
| 1410 | PHIaER7345 | 1410PHIaER7345 |
| 1410 | PHIaER7345 | PHIaER73451410 |
| 1410 | PHIaER7345 | PHIaE1410R7345 |
| 1410 | PHIaER7345 | 1PHIaER7345410 |
| 1410 | PHIaER7345 | 14101410PHIaER7345 |
| 1410 | PHIaER7345 | 1410PHIaER73451410 |
| 1410 | PHIaER7345 | 1410PHIaE1410R7345 |

The target device may have the static portion stored and be able to recreate the dynamic portion (and therefore the combined access credential) for validation and access. For example, if the access credential is received in a known format (e.g., 8 character static portion followed by a one hundred and twenty character dynamic portion), a validation module may separate the static portion from the dynamic portion and validate them individually. In some embodiments, the combined access credential may also include additional information that may allow the target device to deconstruct and validate the credential. For example, the first set number of alphanumeric characters may indicate the relative locations of the static and dynamic portions. As such, the validation module may identify this first set number of characters and identify an logical representation of the combined access credential, and use that logical representation to separate the static portion from the dynamic portion.

In some embodiments, in order to validate the endpoint, CCM 240 may be in communication with the target devices in some embodiments. An exchange of static portions of may be provide to the target devices and/or enough data to recreate the dynamic portion of the access credential (e.g., the seed value). Upon the CCM generating a new static portion and storing the new static portion in vault 250, the CCM can update the target devices 270-280 with the new credentials.

Figure 3:
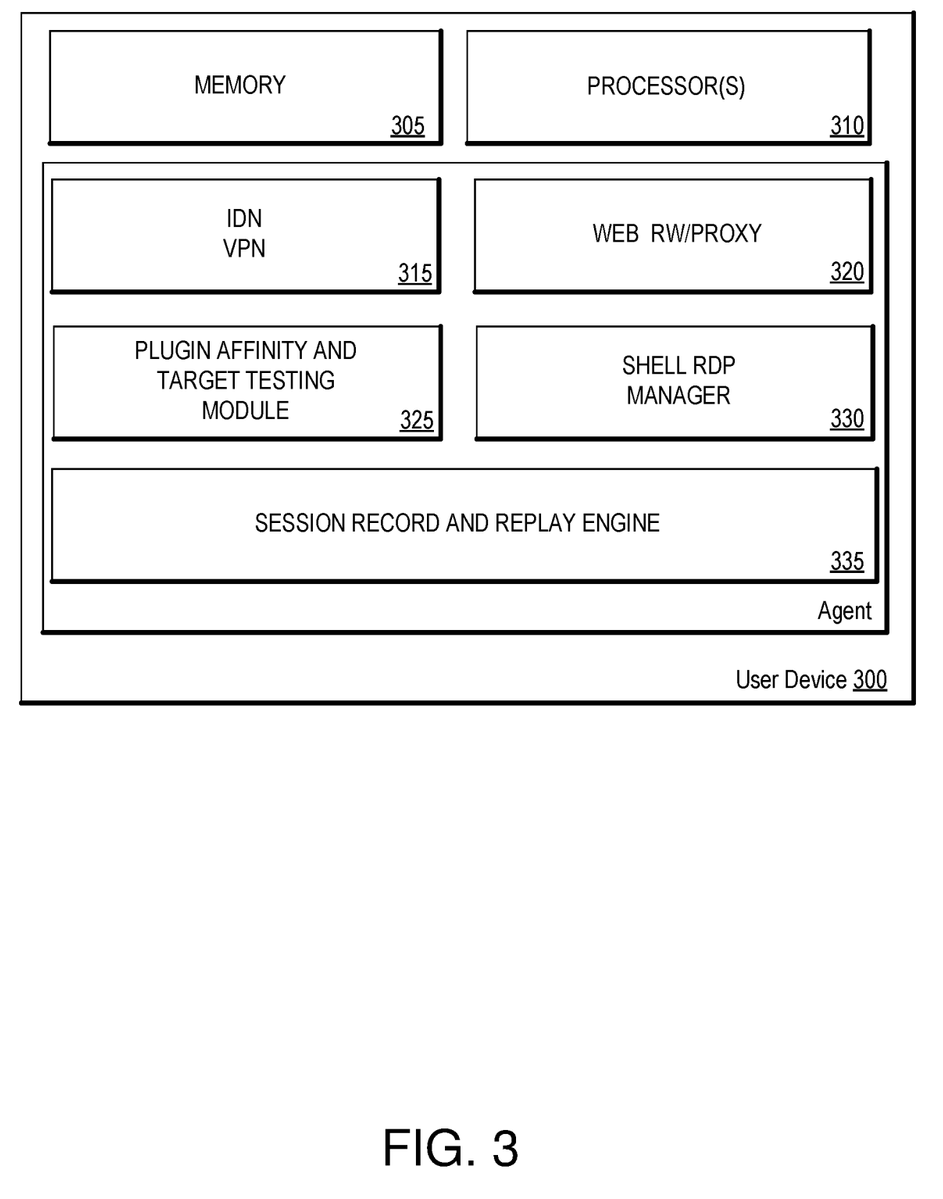
FIG. 3 illustrates a set of components on a user device that may be used in various embodiments of the present technology.

FIG. 3 illustrates a set of components on a user device 300 that may be used in various embodiments of the present technology. As illustrated in FIG. 3, user device 300 can include memory 305 (e.g., volatile memory and/or nonvolatile memory), processor(s) 310 for executing processing instructions, and an agent. The agent can include IDN/VPN 315, web rewrite/proxy 320, plugin affinity and target testing module, 325, shell RDP manager 330, and a session record and replay engine 335. Each of these modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information. In accordance with some embodiments of the present technology, memory 305 can encompass any type of, but is not limited to, volatile memory, nonvolatile memory, and dynamic memory. For example, memory 305 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 305.

Memory 305 may be used to store instructions for running one or more applications or modules on processor(s) 310. For example, memory 305 could be used in one or more embodiments to house all or some of the instructions needed to execute the functionality of IDN/VPN 315, web rewrite/proxy 320, plugin affinity and target testing module 325, shell RDP manager 330, and a session record and replay engine 335. User device 300 may also include an operating system that provides a software package that is capable of managing various hardware resources.

Processor(s) 310 are the main processors of user device 300 used to control the operation of user device 300 which may include various application processors, coprocessors, and other dedicated processors for operating user device 300. The volatile and nonvolatile memories found in various embodiments may include storage media for storing information such as processor-readable instructions, data structures, program modules, or other data. Some examples of information that may be stored include basic input/output systems (BIOS), operating systems, and applications.

IDN/VPN 315 can be an identity defined VPN networking component that can build a tunnel from the endpoint device to a private network (e.g. access manager 130). In accordance with various embodiments, IDN/VPN 315 can create the tunnel using a variety of tunneling protocols such as, but not limited to, IP in IP (IPIP), SIT/IPv6, Generic Routing Encapsulation (GRE), Secure Socket Tunneling Protocol (SSTP), Internet Protocol Security (IPSec), Layer 2 Tunneling Protocol (L2TP), Virtual Extensible Local Area Network (VXLAN), SSL VPN, or the like. In some embodiments, IDN/VPN 315 can determine the identity of the endpoint device and check for any changes to the hardware and software configurations of the endpoint device. If no issues are identified then IDN/VPN can initiate a tunnel to the private network and/or connection to an access manager. IDN/VPN can then exchange ID's for registration.

Web rewrite/proxy 320 can listen for connection details (e.g., login credentials) from specific connections. In some embodiments, web rewrite/proxy 320 monitors specific TCP ports and can inject credentials sent by a triage zone. Plugin affinity and target testing module 325 can check the availability of the agent. In some embodiments, the confirmation of availability may also include time to live (TTL) and recheck availability upon expiration. If at any point plugin affinity and target testing module 325 cannot validate the agent, then the tunnel created by IDN/VPN 315 can be terminated. Shell RDP manager 330 waits for connection details or information being sent from the head end via the tunnel. In response to receiving the connection details or information, shell RDP manager 330 initiates connections to shell RDP.

Session record and replay engine 335 can receive record activity information (e.g., snapshots, no activity messages, etc.) received from a plugin within the web portal/browser. For example, in some embodiments the plugin may take screenshots at designated intervals (e.g., 500 ms) and send those snapshots to session record and replay engine 335 which routes that record activity information to a storage facility where automated or manual techniques can be used for additional real-time monitoring (e.g., using artificial intelligence or other data analysis tools) or auditing.

Figure 4:
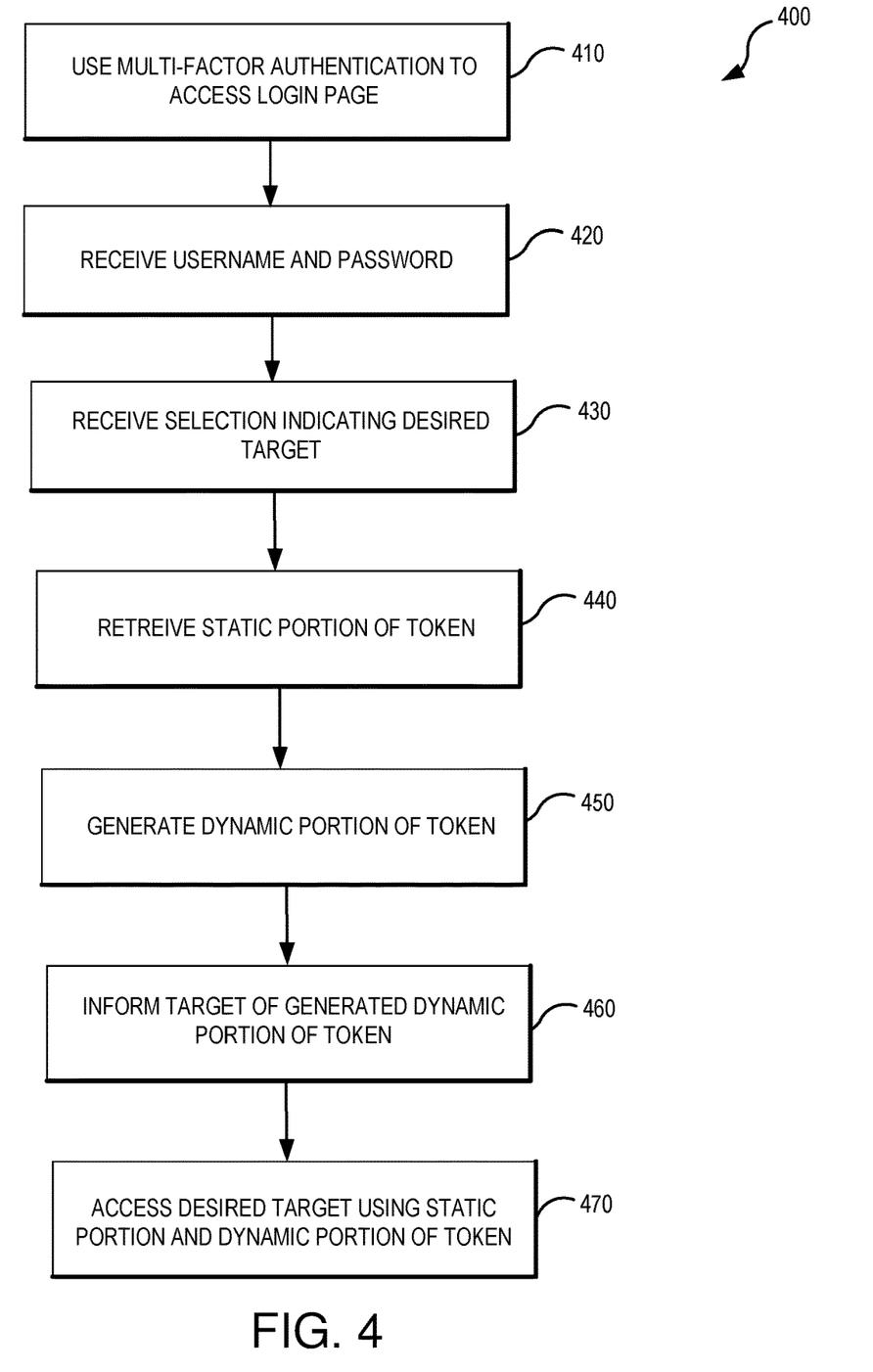
FIG. 4 is a flowchart illustrating an example of a set of operations that may be used in accordance with some embodiments of the present technology.

FIG. 4 is a flowchart illustrating an example of a set of operations 400 that may be used in accordance with some embodiments of the present technology. As illustrated in FIG. 4, MFA authentication can be used during access operation 410 to validate the user. Once the user is validated, a login page requesting a username and password can be presented. During receiving operation 420, the username and password can be received and a landing page for selecting target devices can be presented. During receiving operation 430 a selection can be received from the user indicating a desired target device that the user desires to access.

Using information about the user (e.g., unique ID, etc.) and the desired target device, retrieving operation 440 can retrieve a static portion of a token or other authentication credential. The static portion assigned to the user may be different for each target device in various embodiments. Generation operation 450 can generate a dynamic portion which can be combined with the static portion to create a combined access credential. In accordance with various embodiments, generation operation 450 may generate a dynamic portion using a random number generator, a seed value selected in a specific manner, or other technique.

Access operation 460 can use the combined token or authentication credential (e.g., static portion+dynamic portion) to access the desired target device.

For example, access operation may send the combined token or access credential to the desired target device for authentication. The target device may initially evaluate the authentication credential to ensure proper form (e.g., expected hash value, a certain number of fields, a certain number of characters, etc.). If the form is improper, access can be denied. If the form is proper, then the target device may separate the static portion and the dynamic portion and verify both individually. For example, the dynamic portion may be submitted to a separate validation device for authentication or may be evaluated by the target device itself.

Figure 5:
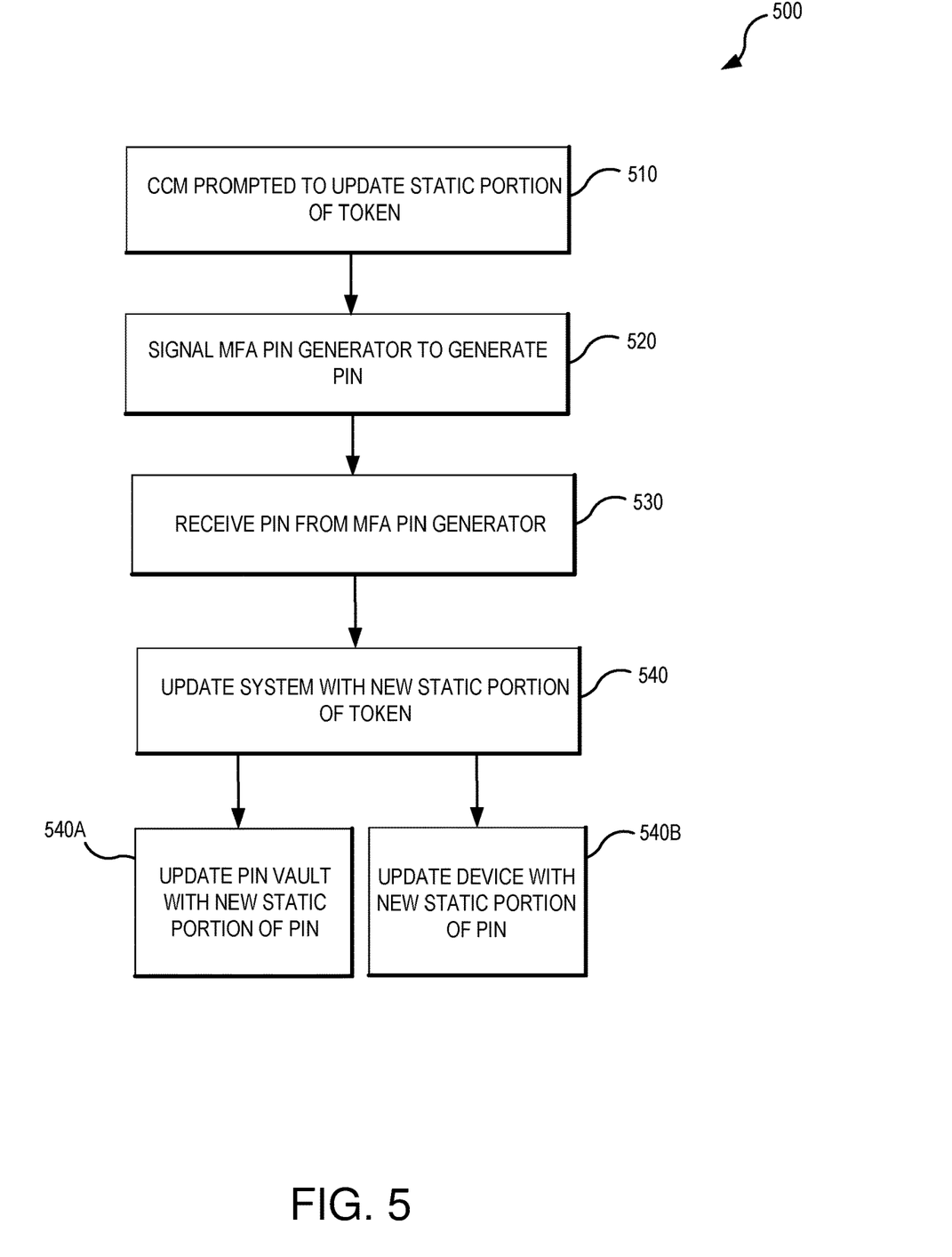
FIG. 5 is a flowchart illustrating an update scheme of a set of operations as part of an update scheme that may be used in accordance with some embodiments of the present technology.

FIG. 5 is a flowchart illustrating an example set of operations 500 that may be used in an update scheme in accordance with some embodiments of the present technology. As illustrated, the CCM may be prompted to update the static portion of a token during update operation 510. In accordance with various embodiments update operation may be scheduled at specified times (e.g., time driven) or triggered in response to a detection of certain events (e.g., event driven routine). For example, update operation 510 may be scheduled to update the static portion of the access credential or token every hour, every day, every week, or the like. As another example, update operation 510 may be scheduled to update the static portion of the access credential after detecting a security breach, a number of uses (e.g., 5, 10, 100, etc.) at a target device.

Once the CCM has been prompted to update the static portion, operation 520 may signal to a static credential generator (e.g., the MFA PIN generator) to generate a static token (e.g., a new ten digit PIN). The CCM may then receive the newly generated static portion from the static credential generator in receiving operation 530. Upon receiving the new static portion of the credential, update operation 540 can inform the system of the new static portion of the token in operation 540. Informing the system may include updating an entry in vault 250 in operation 540A and one of the target devices 270-280 in operation 540B.

Exemplary Computer System Overview

Aspects and implementations of the authentication system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

FIG. 6 illustrates computing system 610, which is representative of any system or collection of systems in which the various applications, services, scenarios, and processes disclosed herein may be implemented. For example, computing system 610 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 610 may be implemented as a single apparatus, system, or device or may be implemented in a distributed manner as multiple apparatuses, systems, or devices. Computing system 610 includes, but is not limited to, processing system 620, storage system 630, software 640, applications 650, communication interface system 660, and user interface system 670. Processing system 620 is operatively coupled with storage system 630, communication interface system 660, and optional user interface system 670.

Processing system 620 loads and executes software 640 from storage system 630. When executed by processing system 620 for deployment of scope-based certificates in multi-tenant cloud-based content and collaboration environments, software 640 directs processing system 620 to operate as described herein for at least the various processes, operational scenarios, and sequences discussed in the foregoing implementations. Computing system 610 may optionally include additional devices, features, or functionality not discussed for purposes of brevity.

Referring still to FIG. 6, processing system 620 may comprise a micro-processor and other circuitry that retrieves and executes software 640 from storage system 630. Processing system 620 may be implemented within a single processing device, but may also be distributed across multiple processing devices or sub-systems that cooperate in executing program instructions. Examples of processing system 620 include general purpose central processing units, application specific processors, and logic devices, as well as any other type of processing device, combinations, or variations thereof.

Storage system 630 may comprise any computer readable storage media readable by processing system 620 and capable of storing software 640. Storage system 630 may include volatile and nonvolatile, removable and non-removable media implemented in any method or technology for storage of information, such as computer readable instructions, data structures, program modules, or other data. Examples of storage media include random access memory, read only memory, magnetic disks, nonvolatile memory, battery backed memory, Non-Volatile DIMM memory, phase change memory, memristor memory, optical disks, flash memory, virtual memory and non-virtual memory, magnetic cassettes, magnetic tape, magnetic disk storage or other magnetic storage devices, or any other suitable storage media.

In addition to computer readable storage media, in some implementations storage system 630 may also include computer readable communication media over which at least some of software 640 may be communicated internally or externally. Storage system 630 may be implemented as a single storage device, but may also be implemented across multiple storage devices or sub-systems co-located or distributed relative to each other. Storage system 630 may comprise additional elements, such as a controller, capable of communicating with processing system 620 or possibly other systems.

Software 640 may be implemented in program instructions and among other functions may, when executed by processing system 620, direct processing system 620 to operate as described with respect to the various operational scenarios, sequences, and processes illustrated herein. For example, software 640 may include program instructions for directing the system to perform the processes described above.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 640 may include additional processes, programs, or components, such as operating system software, virtual machine software, or application software. Software 640 may also comprise firmware or some other form of machine-readable processing instructions executable by processing system 620.

In general, software 640 may, when loaded into processing system 620 and executed, transform a suitable apparatus, system, or device (of which computing system 610 is representative) overall from a general-purpose computing system into a special-purpose computing system. Indeed, encoding software on storage system 630 may transform the physical structure of storage system 630. The specific transformation of the physical structure may depend on various factors in different implementations of this description. Examples of such factors may include, but are not limited to, the technology used to implement the storage media of storage system 630 and whether the computer-storage media are characterized as primary or secondary storage, as well as other factors.

For example, if the computer readable storage media are implemented as semiconductor-based memory, software 640 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 660 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 670 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 670. In some cases, the input and output devices may be combined in a single device, such as a display capable of displaying images and receiving touch gestures. The aforementioned user input and output devices are well known in the art and need not be discussed at length here. In some cases, the user interface system 670 may be omitted when the computing system 610 is implemented as one or more server computers such as, for example, blade servers, rack servers, or any other type of computing server system (or collection thereof).

User interface system 670 may also include associated user interface software executable by processing system 620 in support of the various user input and output devices discussed above. Separately or in conjunction with each other and other hardware and software elements, the user interface software and user interface devices may support a graphical user interface, a natural user interface, an artificial intelligence (AI) enhanced user interface that may include a virtual assistant or bot (for example), or any other type of user interface, in which a user interface to an authentication application may be presented.

Communication between computing system 610 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. An access management system comprising:
   an encrypted data store having stored therein multiple usernames and portions of passwords;
   a multi-factor authenticator to grant a user access to a login page by automatically generating a fingerprint of a user device;
   a device selector that presents the user with one or more privileged access management (PAM) or cloud access security brokers (CASB) target computing devices the user can choose to access;
   a credential change manager configured to set access credentials for the one or more PAM or CASB target computing devices,
   wherein the credential change manager is accessed with the usernames and portions of passwords stored in the encrypted data store;
   a vault coupled with the credential change manager, wherein the vault stores one or more static passwords assigned by the credential change manager, and
   wherein the one or more static passwords each correspond to the user, a PAM or CASB target computing device, or a combination of the user and PAM or CASB target computing device; and
   a dynamic credential generator to generate a dynamic password to be verified along with the static password at the PAM or CASB target computing device such that both the dynamic password and the static password are verified at the PAM or CASB target computing device before access is granted to a selected PAM or CASB target computing device.

2. The access management system of claim 1, wherein the vault is a PIN vault, the one or more static passwords are static Personal Identification Numbers (PINs), and the dynamic password is a dynamic PIN to be combined with the static PIN.

3. The access management system of claim 1, wherein the credential change manager routinely changes the one or more static passwords and sets a seed for the dynamic password using the dynamic credential generator.

4. The access management system of claim 3, wherein the one or more PAM or CASB target computing devices are in communication with the credential change manager and are routinely updated with the static password in addition to being updated with the dynamic password each time the dynamic password is generated.

5. A method for granting a user access to a device selection module through multi-factor authentication comprising:
   at an access manager:
   after validating a user using multi-factor authentication, presenting the user with a landing page listing one or more privileged access management (PAM) or cloud access security brokers (CASB) target computing devices that the user can access;
   receiving a selection indicating a PAM or CASB target computing device that the user desires to access from the listed one or more PAM or CASB target computing devices that the user can access;
   retrieving a static portion of an access credential from a vault,
   wherein the static portion of the access credential corresponds to the user, the desired PAM or CASB target computing device, or a combination of the user and desired PAM or CASB target computing device;
   generating a dynamic portion of the access credential;
   submitting, from the access manager, both the dynamic portion of the access credential and the static portion of the access credential to the desired PAM or CASB target computing device for validation at the PAM or CASB target computing device such that both the dynamic portion of the access credential and the static portion of the access credential are verified at the PAM or CASB target computing device.

6. The method of claim 5, further comprising combining the static portion of the access credential with the dynamic portion of the access credential to create a combined token which is submitted to the desired PAM or CASB target computing device.

7. The method of claim 5, wherein the vault is a Personal Identification Number (PIN) vault, the static portion of the access credential is a static PIN, and the dynamic portion of the access credential is a dynamic PIN.

8. The method of claim 5, wherein the one or more PAM or CASB target computing devices comprise one or more privileged access management or cloud access security broker targets.

9. The method of claim 5, further comprising routinely changing the static portion of the access credential and setting a seed for the dynamic portion of the access credential.

10. The method of claim 9, further comprising routinely updating with the static portion of the access credential.

11. A non-transitory computer-readable media having stored thereon program instructions, which when executed by a computing system, direct a computing system to at least:
   after validating a user using multi-factor authentication, presenting the user with a landing page listing one or more privileged access management (PAM) or cloud access security brokers (CASB) target computing devices that the user can access;
   receive a selection indicating a PAM or CASB target computing device that the user desires to access from the listed one or more PAM or CASB target computing devices that the user can access;
   retrieve a static portion of a token from a password vault, wherein the static portion of the token corresponds to the user, the desired PAM or CASB target computing device, or a combination of the user and desired PAM or CASB target computing device;
   generate a dynamic portion of the token;
   combine the static portion of the token with the dynamic portion of the token to create a combined token; and
   grant the user access to the desired PAM or CASB target computing device upon validation of both the dynamic portion and the static portion of the combined token at the desired PAM or CASB target computing device.

12. The non-transitory computer-readable media of claim 11, wherein the password vault stores one or more static portions of tokens each corresponding to different users.

13. The non-transitory computer-readable media of claim 12, wherein the password vault is a Personal Identification Number (PIN) vault, the static portion of the token is a static PIN, and the dynamic portion of the token is a dynamic PIN.

14. The non-transitory computer-readable media of claim 11, further comprising program instructions, which when executed by the computing system, direct the computing system to routinely change the static portion of the token and set a seed for the dynamic portion of the token.

15. The non-transitory computer-readable media of claim 14, wherein the desired PAM or CASB target computing device is in communication with the credential change manager and are routinely updated with the static portion of the token in addition to being updated with the dynamic portion of the token each time the dynamic portion of the token is generated.

* * * * *